(12) United States Patent
Venkitakrishnan

(10) Patent No.: US 6,597,692 B1
(45) Date of Patent: *Jul. 22, 2003

(54) SCALABLE, RE-CONFIGURABLE CROSSBAR SWITCH ARCHITECTURE FOR MULTI-PROCESSOR SYSTEM INTERCONNECTION NETWORKS

(75) Inventor: Padmanabha I. Venkitakrishnan, Sunnyvale, CA (US)

(73) Assignee: Hewlett-Packard Development, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/296,045

(22) Filed: Apr. 21, 1999

(51) Int. Cl.[7] .................................................. H04L 12/50
(52) U.S. Cl. ........................ 370/380; 370/400; 710/317; 712/11
(58) Field of Search ................................. 370/380, 381, 370/352, 353, 360, 366, 396, 398, 427, 428, 357, 389, 392, 400, 401; 712/11, 17, 20; 710/305, 316, 317

(56) References Cited

U.S. PATENT DOCUMENTS

| | | | |
|---|---|---|---|
| 4,379,326 A | 4/1983 | Anastas et al. | 364/200 |
| 4,965,793 A | 10/1990 | Polzin et al. | 370/94.1 |
| 4,968,977 A | 11/1990 | Chinnaswamy et al. | 340/825.8 |
| 5,107,493 A | 4/1992 | Eng et al. | 370/94.1 |
| 5,179,552 A * | 1/1993 | Chao | 370/427 |
| 5,179,669 A | 1/1993 | Peters | 395/325 |
| 5,191,578 A | 3/1993 | Lee | 370/63 |
| 5,261,059 A | 11/1993 | Hedberg et al. | 395/325 |
| 5,280,474 A | 1/1994 | Nickolls et al. | 370/60 |
| 5,386,511 A | 1/1995 | Murata et al. | 395/200 |
| 5,471,592 A | 11/1995 | Gove et al. | 395/300.03 |
| 5,513,371 A | 4/1996 | Cypher et al. | 395/800 |
| 5,522,083 A | 5/1996 | Gove et al. | 395/800 |
| 5,555,543 A | 9/1996 | Grohoski et al. | 370/58.1 |
| 5,559,970 A * | 9/1996 | Sharma | 710/317 |
| 5,598,408 A | 1/1997 | Nickolls et al. | 370/351 |
| 5,598,568 A | 1/1997 | Frisch | 395/800 |
| 5,617,413 A * | 4/1997 | Monacos | 370/400 |
| 5,724,351 A * | 3/1998 | Chao et al. | 370/395.42 |
| 5,790,539 A * | 8/1998 | Chao et al. | 370/390 |
| 5,822,605 A * | 10/1998 | Higuchi et al. | 712/11 |
| 6,138,185 A * | 10/2000 | Nelson et al. | 710/317 |
| 6,181,159 B1 * | 1/2001 | Rangasayee | 326/39 |
| 6,263,415 B1 * | 7/2001 | Venkitakrishnan | 712/11 |

FOREIGN PATENT DOCUMENTS

| | | | |
|---|---|---|---|
| EP | 0551188 A2 | 1/1993 | G06F/15/16 |
| GB | 2262173 | 6/1993 | G06F/11/20 |
| GB | 2262174 | 6/1993 | G06F/11/20 |
| GB | 2262175 | 6/1993 | G06F/11/20 |

* cited by examiner

*Primary Examiner*—Douglas Olms
*Assistant Examiner*—Brian Nguyen

(57) ABSTRACT

The present invention provides a new crossbar switch which is implemented by a plurality of parallel chips. Each chip is completely programmable to couple to every node in the system, e.g., from one node to about one thousand nodes (corresponding to present-day technology limits of about one thousand I/O pins) although conventional systems typically support no more than 32 nodes. The crossbar switch can be implemented to support only one node, then one chip can be used to route all 64 bits in parallel for 64 bit microprocessors.

16 Claims, 4 Drawing Sheets

SCALABLE, RE-CONFIGURABLE CROSSBAR SWITCH ARCHITECTURE FOR MULTI-PROCESSOR SYSTEM INTERCONNECTION NETWORKS

CROSS-REFERENCE TO RELATED APPLICATIONS

The present application contains subject matter related to a concurrently filed U.S. patent application by Padmanabha I. Venkitakrishnan entitled "Backup Redundant Routing System Crossbar Switch Architecture for Multi-Processor System Interconnection Networks". The related application is also assigned to Hewlett-Packard Company, is identified by Ser. No. 09/296,038, now U.S. Pat. No. 6,263,415 B1, and is hereby incorporated by reference.

The present application also contains subject matter related to a concurrently filed U.S. patent application by Padmanabha I. Venkitakrishnan, Gopalakrishnan Janakiraman, Tsen-Gong Jim Hsu, and Rajendra Kumar entitled "Scalable System Control Unit for Distributed Shared Memory Multi-Processor Systems". The related application is,also assigned to Hewlett-Packard Company, is identified by Ser, No. 09/295,668, now U.S. Pat. No. 6,378,029 and is hereby incorporated by reference.

TECHNICAL FIELD

The present invention relates generally to multi-processor computer systems and more particularly to crossbar switch architecture.

BACKGROUND ART

High performance, multi-processor systems with a large number of microprocessors are built by interconnecting a number of node structures, each node containing a small number of microprocessors. This necessitates an interconnection network that is efficient in carrying control information and data between the nodes of the multi-processor.

In the past, crossbar switches, which route communications between the "nodes" of a network, included logic for determining a desired destination from message header, and for appropriately routing all of the parallel bits of a transmission; e.g., 64 bits in parallel for a 64 bit microprocessor. A configuration such as this presents inherent scalability problems, principally because its number of nodes or ports limits each crossbar switch. For example, a typical crossbar switch might service four nodes in parallel, and route 64 bits to one of the four nodes; if more nodes were desired, multiple crossbar switches would be cascaded to support the additional nodes. Such a configuration is not readily scalable either in terms of bandwidth; i.e., such a system could not readily be reconfigured to handle 128 bits in parallel to support higher-performance systems, or because the more cascaded structures, the greater the routing overhead and associated latency.

Thus, a method or architecture has been long sought and long eluded those skilled in the art, which would be scalable and re-configurable while having low latency. The system would be packet switched and provide a high availability (HA) crossbar switch architecture.

DISCLOSURE OF THE INVENTION

The present invention provides a new crossbar switch which is implemented by a plurality of parallel chips. Each chip is completely programmable to couple to every node in the system, e.g., from one node to about one thousand nodes (corresponding to present-day technology limits of about one thousand I/O pins) although conventional systems typically support no more than 32 nodes. The crossbar switch can be implemented to support only one node such that one chip can be used to route all 64 bits in parallel for 64 bit microprocessors or 128 bits in parallel for a 128 bit processor.

The present invention provides a flexible structure that allows dynamic programming of its data routing, such that one commercial crossbar system can support many different network architectures. With dynamic scalability, if nodes are added to an existing system, then different programming may be used to reconfigure the crossbar switches.

The present invention provides a multi-processor system interconnection network based on a scalable, re-configurable, low latency, packet switched and highly available crossbar switch architecture.

The present invention further provides a scalable system by parallelizing the interconnection network into a number of identical crossbar switches. This enables implementation of the interconnection network function without pushing the limits of integrated circuit and system packaging technologies. At the same time, the invention provides a method to substantially increase the bandwidth of a multi-processor system.

The present invention further provides a method to re-configure the ports of the crossbar switches so that a smaller number of crossbar switch circuits can provide the required bandwidth when the multi-processor system consists of a small number of node structures, thus reducing system hardware cost.

The invention described also provides for a redundant interconnection network in parallel to the primary interconnection network, thus significantly enhancing the reliability and high-availability of the multi-processor system.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
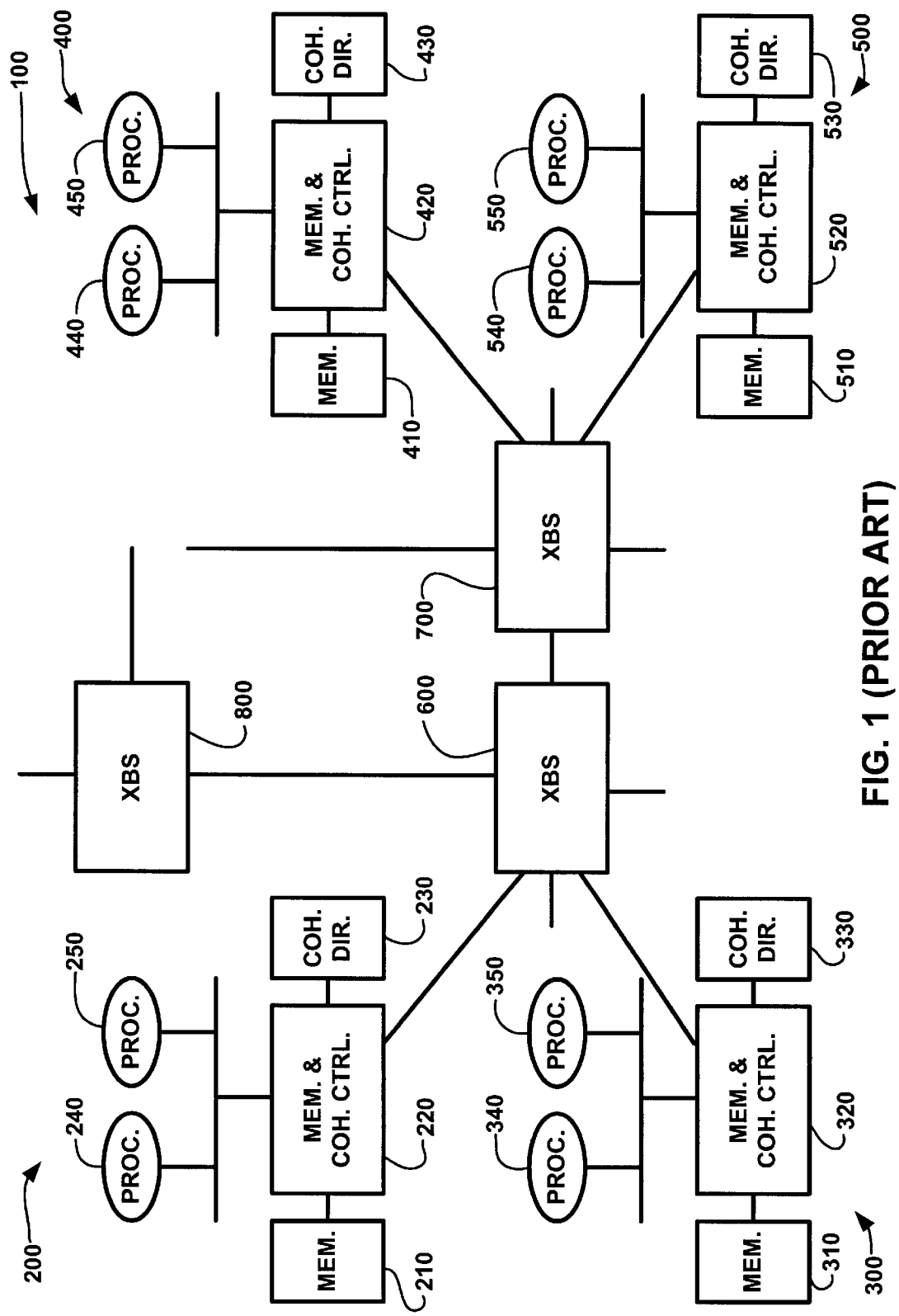
FIG. 1 (PRIOR ART) is a prior art Distributed Shared Memory (DSM) computer system.

Referring now to FIG. 1, therein is shown a Distributed Shared Memory (DSM) computer system 100. The DSM computer system 100 has a plurality of nodes 200, 300, 400, and 500. The nodes 200 and 300 are connected to a crossbar switch 600. The nodes 400 and 500 are connected to a crossbar switch 700. The crossbar switches 600 and 700 are part of a network which includes additional communication switches, such as the communication switch 800.

In the DSM computer system 100, the nodes 200, 300, 400, and 500 contain respective memory units 210, 310, 410, and 510. The memory units 210, 310, 410, and 510 are respectively operatively connected to memory and coherence controllers 220, 320, 420, and 520.

Further, in the DSM computer system 100, each line of memory (typically a section of memory is tens of bytes in size) is assigned a "home node", such as the node 200, which maintains the sharing of that memory line and guarantees its coherence. The home node maintains a directory which identifies the nodes that possess a copy of that memory line. In the nodes 200, 300, 400, and 500 the directories are coherence directories 230, 330, 430, and 530. When a node requires a copy of a memory line, it requests the memory line from the home node. The home node supplies the data from its memory unit if it has the latest data. If another node has the latest copy of the data, the home node directs this node to forward the data to the requesting node. The home node employs a coherence protocol to ensure that when a node writes a new value to the memory line, all other nodes see this latest value. The coherence controllers, which are a part of the memory and coherence controllers 220, 320, 420, and 520, implement this coherence functionality.

The memory and coherence controllers 220 are connected to a number of central processing units (CPUs), generally four or eight processors, such as processors 240 and 250. The memory and coherence controllers 320 are shown connected to the processors 340 and 350. The memory and coherence controllers 420 are shown connected to processors 440 and 450. And the memory and coherence controllers 520 are shown connected to the processors 540 and 550.

Figure 2:
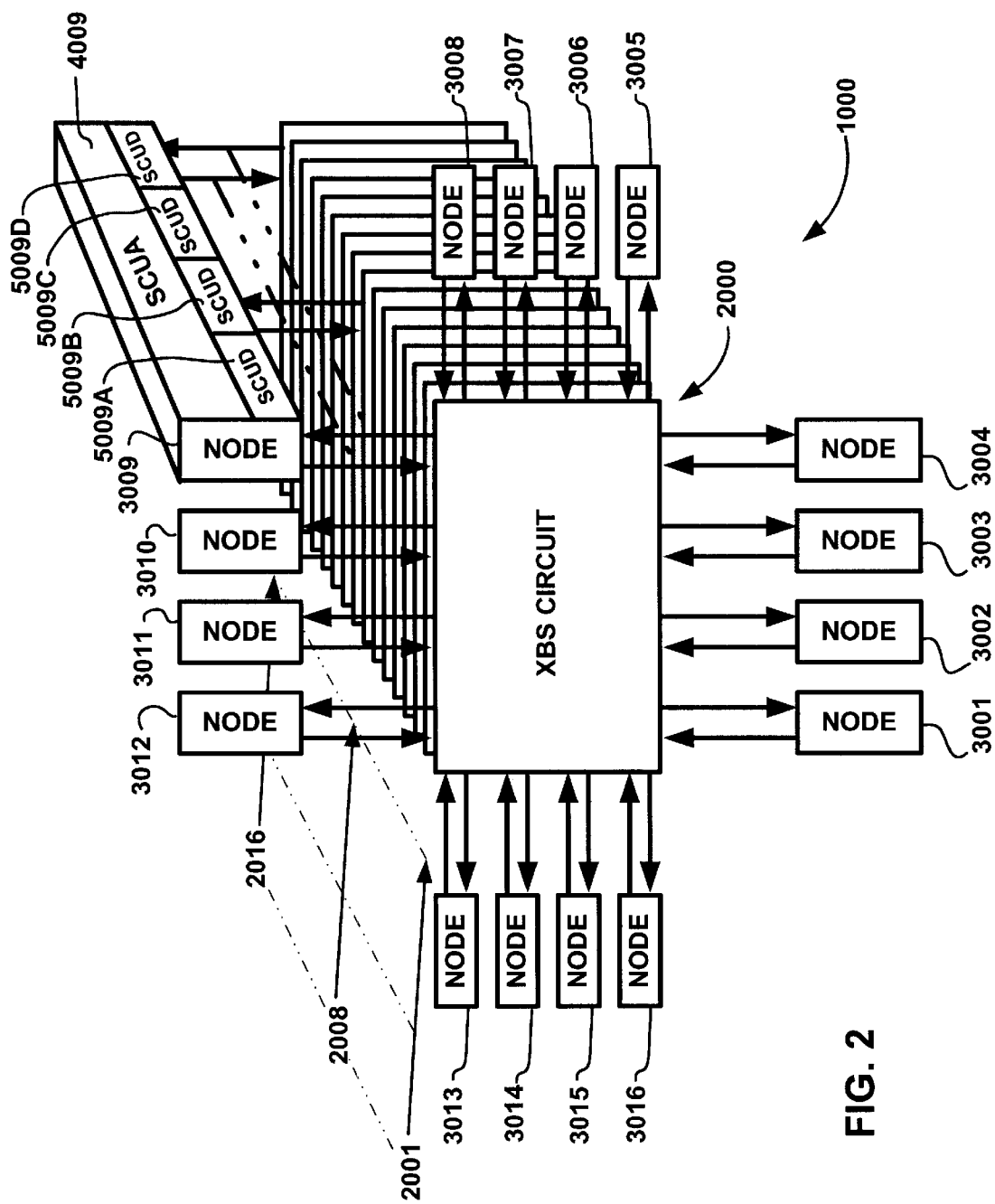
FIG. 2 is a functional block diagram of the interconnection network for a DSM computer system according to the present invention.

Referring now to FIG. 2, therein is shown a functional block diagram of the interconnection network for a DSM computer system 1000 according to the present invention. The DSM computer system 1000 has a cross bar switch 2000, which consists of a plurality of crossbar switch integrated circuits (XBS circuits) 2001 through 2016. A typical high-performance DSM computer system 1000 can potentially have 16 XBS circuits or more, whereas low and medium performance systems can conceivably have just 8 or even only 4 XBS circuits. The XBS circuits can all be packaged in the same integrated circuit chip or on separate integrated circuit chips. This arrangement meets the large bandwidth requirements of a high-performance DSM computer system 1000 in which the interconnection network is easily scalable.

Each of the XBS circuits 2001 through 2016 has 16 ports which are respectively connected to nodes 3001 through 3016. The node 3009 is typical, and so each of the other nodes is somewhat similarly constructed and would have components which would be similarly numbered. In addition to the processors and memory, the node 3009 also includes a system control unit (SCU) which includes the coherency controls and which is split into a system control unit address (SCUA) section 4009 and a system control unit data (SCUD) section 5009. The SCUD section 5009 is scalable in that additional SCUD sections may be added as required. In FIG. 2, four SCUD sections 5009A through 5009D are shown. Each SCUD section, such as SCUD section 5009A, has four ports connected to the corresponding XBS circuits, such as XBS circuits 2001 through 2004 for the SCUD section 5009A. Similarly, SCUD section 5009B is connected to the XBS circuits 2005 through 2009. As would be evident to those skilled in the art, the four ports of subsequent SCUD sections would be respectively connected to subsequent ports of subsequent XBS circuits. This is represented by the phantom lines shown perpendicular to the arrows indicating output and input to the ports.

Since each port of the XBS circuit has the same functionality, the above arrangement not only allows the varying of the number of XBS circuits in the interconnection network 1000, but allows bundling of several ports on an XBS circuit to derive ports with higher bandwidth. In other words, the architecture of the XBS circuit allows scaling in two dimensions, i.e., varying number of XBS circuits as well as varying the number of port on a single XBS circuit. This re-configurable and bundling feature of the ports of the crossbar switch 2000 allows having a smaller number of XBS circuits to derive the required bandwidth when the multiprocessor system consists of a small number of nodes, thus reducing system hardware cost.

Further, building the interconnection network 1000 with many of these parallelized XBS circuits as a plurality of integrated circuit chips helps in implementing these parts without pushing integrated circuit and part packaging technology limits. The scalable parallelized XBS circuits make packaging the interconnection network within the multiprocessor system cabinet very simple.

Figure 3:
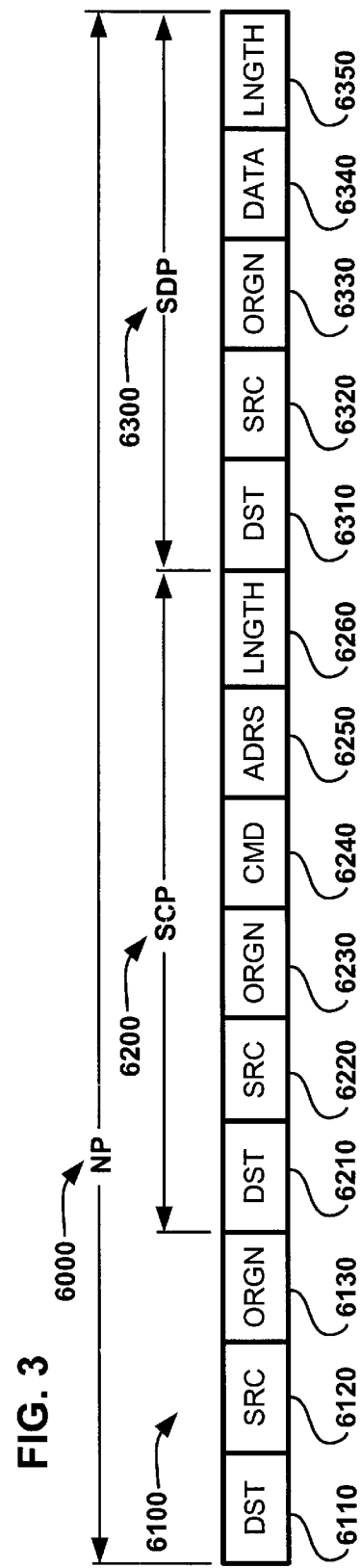
FIG. 3 is an illustration of the interconnection network packet format according to the present invention.

Referring now to FIG. 3, therein is shown an illustration of the interconnection network packet formats according to the present invention. The network packet (NP) 6000 controls the control and data signal transversals through the interconnection network 1000 between its source and destination nodes. The network packet 6000 is configured to provide routing information 6100, system control unit control packet (SCP) information 6200, and system control unit data packet (SDP) information 6300.

The routing information 6100 provides the following information: destination 6110, source 6120, and originator 6130.

The SCP information 6200 contains the following information: destination 6210, source 6220, originator 6230, the command 6240, the address 6250, and the length 6260.

Figure 4:
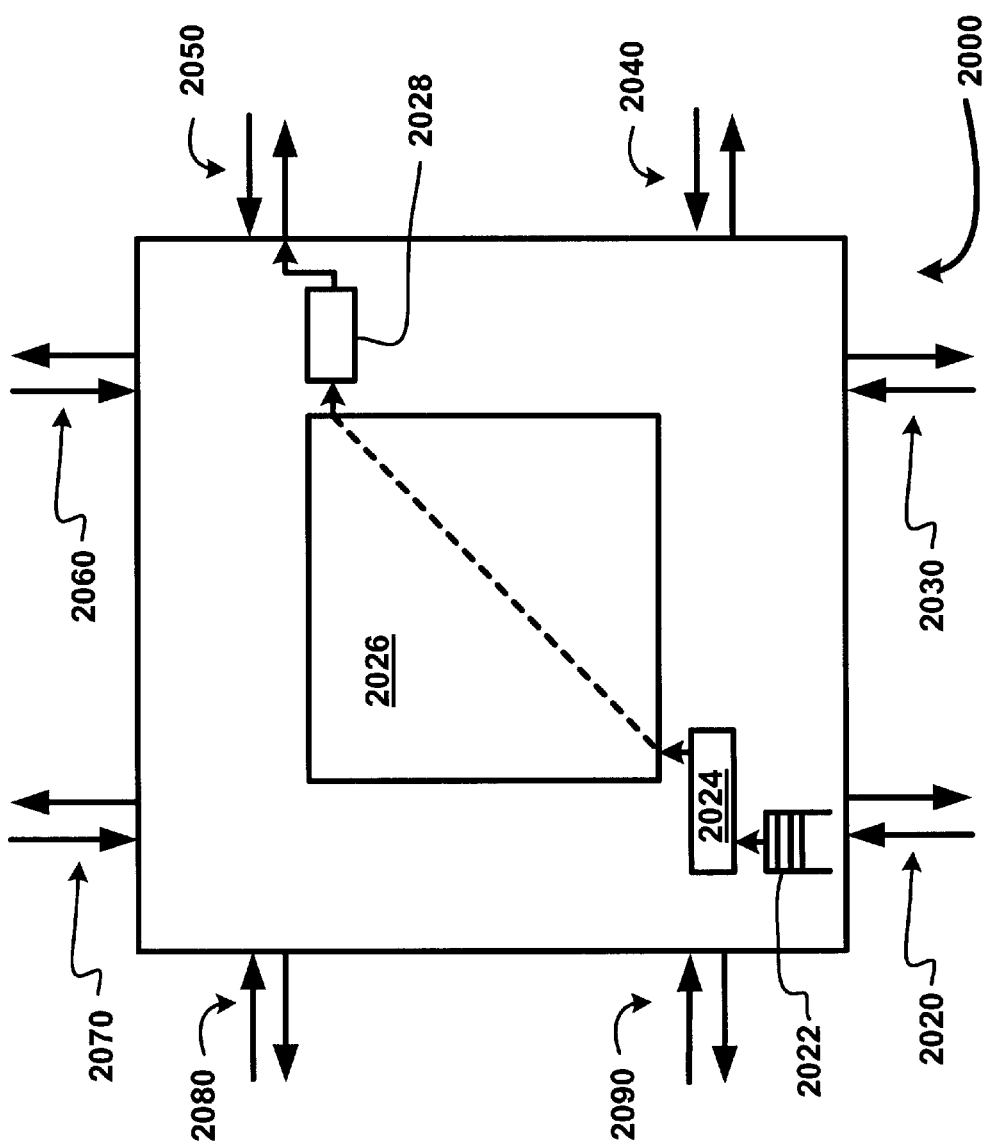
FIG. 4 is a micro-architectural diagram of the crossbar switch circuit according to the present invention.

The SDP information 6300 contains the following information: destination 6310, source 6320, the originator 6330, the data 6340, and its length 6350. Referring now to FIG. 4, therein is shown a micro-architectural diagram of the XBS circuit 2000 with 8 ports 2020, 2030, 2040, 2050, 2060, 2070, 2080, and 2090, as shown. Taking port 2020 as typical, signals from the source node enter an input buffer 2022 and then are input to the decode and setup crossbar circuitry 2024. The circuitry 2024 is connected to a programmable cross-bar switch core 2026 which provides the network packet 6000 to output drivers 2028 and then through the port 2050 to the destination node.

Figure 5:
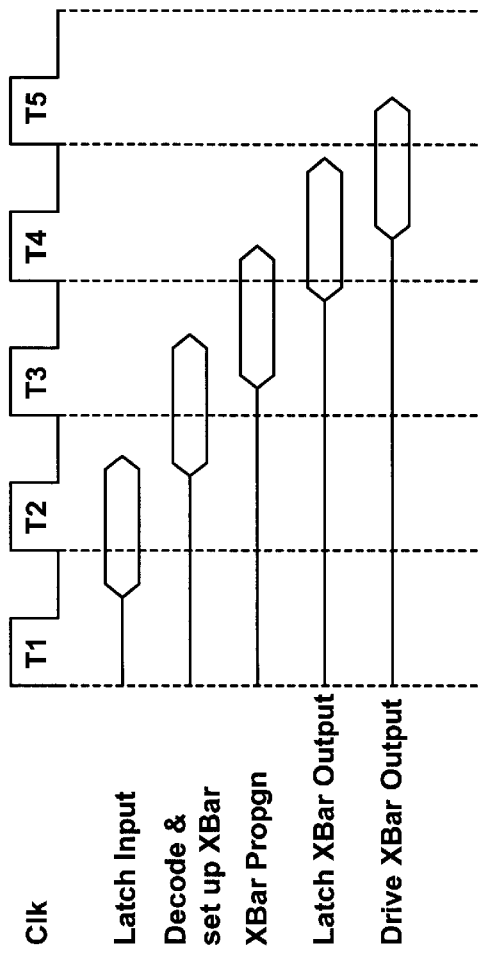
FIG. 5 is a timing diagram of the crossbar switch.

Referring now to FIG. 5, therein is shown the low latency transfer of the present invention in which the network packet from the source node is delivered to the destination node in four clock cycles.

During the first clock cycle from T1 to T2, there is a latch of the network packet 6000 into the input buffer 2022. During the second clock cycle from T2 to T3, the network packet 6000 is decoded, and the crossbar switch core 2026 is setup.

During the third clock cycle from T3 to T4, the network packet 6000 is propagated through the latch and switch.

During the fourth clock cycle from T4 to T5, the network packet 6000 is driven out through the destination port 2050.

In operation, the control and data signal traversals through the interconnection network 1000 between its source and destination nodes, which could be from node 3001 to node 3008, is accomplished by moving the network packet 6000. The destination 6110 information and the source 6130 information contain the information on the nodes involved for routing purposes. The SCP 6200 information and the SDP 6300 information are generated and used by the source and destination nodes by providing control information and data.

To meet the large bandwidth requirements of high performance DSM computer systems, the DSM computer system 1000 can have 16 XBS circuits, 2001 through 2016, which can all be integrated into the same integrated circuit or be separate circuits in order to simplify the making of the integrated circuits or packaging the integrated circuits.

For an XBS circuit 2001 having 16 ports operating at 400 MHz the bandwidth could be 1.6 GB/s per part. At the same time, only 608 signal pins would be required. From the above, it will be evident that it is possible in low and medium performance systems to have a smaller number of XBS circuits when there are a smaller number of node structures and still be able to retain the required bandwidth. This would substantially reduce system hardware cost, while at the same time providing a great deal of flexibility.

In accordance with the present invention, a new crossbar switch is implemented by a plurality of parallel chips. Each chip is completely programmable to couple to every node in the system, e.g., from one node to about one thousand nodes (corresponding to present-day technology limits of about one thousand I/O pins) although conventional systems typically support no more than 32 nodes. For example, if each chip is configured to route up to 64 bits, 32 chips could be provided as part of a crossbar system. If the system as implemented only supported one node, then one chip could be used to route all 64 bits in parallel. On the other hand, if there were 32 nodes, each chip could be connected to all 32 nodes and could be configured by software to each route two bits to attached nodes. Each particular node determines whether a message is intended for it. Thus, the structure provided by the invention reduces latency and promotes scalability. As can be seen from this description, the present invention is a flexible structure that allows dynamic programming of its data routing, such that one commercial crossbar system can support many different network architectures. An advantage of this system is dynamic scalability; if one adds nodes to an existing system, then a different driver may be used to reconfigure the crossbar switches.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A multiprocessor system comprising:
   a plurality of processors, each of said plurality of processors communicating in at least two parallel bits of information;
   a node containing said plurality of processors; and
   a plurality of programmable crossbar switch circuits connected to said node, one of said plurality of crossbar switch circuits routes one of said bits and another of said plurality of crossbar switch circuits routes another of said bits; each of said plurality of crossbar switch circuits having:
      an input port,
      an output port,
      said input port and said output port respectively connected to one and to another of said plurality of processors,
      a programmable crossbar core for selectively connecting said input port and said output port, and
      programmable means for switching said programmable crossbar core whereby signals are routed between said plurality of processors.

2. The multiprocessor system as claimed in claim 1 wherein said plurality of processors communicate with signal packets and said signal packets program said programmable means in said plurality of circuits.

3. The multiprocessor system as claimed in claim 1 including a second node, having a second plurality of processors, and wherein said circuit is connected to said second node and programmable to connect one of said plurality of processors in said node with one of said second plurality of processors in said second node.

4. The multiprocessor system as claimed in claim 1 wherein said programmable means includes a decoder and a core programmer and are responsive to said signals routed between said plurality of processors for switching said programmable crossbar core.

5. The multiprocessor system as claimed in claim 1 wherein said input port has an input buffer thereon and said output port h an output driver thereon.

6. The multiprocessor system as claimed in claim 1 wherein each of said plurality of circuits connects said signals from said input port to said output port in four steps.

7. The multiprocessor system as claimed in claim 6 wherein each of said steps is a clock cycle.

8. The multiprocessor system as claimed in claim 1 wherein each of said plurality of circuits is an individual integrated circuit.

9. A multiprocessor system comprising:
   a plurality of processors, each of said plurality of processors communicating in at least two parallel bits of information;
   a node containing said plurality of processors; and
   a plurality of programmable crossbar switch circuits connected to said node, one of said plurality of crossbar switch circuits routes one of said bits and another of said plurality of crossbar switch circuits routes another of said bits; each of said plurality of crossbar switch circuits having:
      a plurality of input ports,
      a plurality of output ports,
      said plurality of input ports and said plurality of output ports connected to said plurality of processors,
      a programmable crossbar core for selectively connecting individual of ports of said plurality of input ports and individual ports of said plurality of output ports, and
      programmable means for switching said programmable crossbar core whereby signals are routed between said plurality of processors.

10. The multiprocessor system as claimed in claim 9 wherein said plurality of processors communicate with signal packets and each of said signal packets program said programmable means in one of said plurality of circuits.

11. The multiprocessor system as claimed in claim 9 including a plurality of nodes, each having a plurality of processors, and wherein said plurality of circuits are connected to said plurality of nodes and programmable to connect one of said plurality of processors in said node with one of said plurality of processors in said plurality of nodes.

12. The multiprocessor system as claimed in claim 9 wherein said programmable means includes a decoder and a core programmer and are responsive to said signals routed between said plurality of processors for switching said programmable crossbar core.

13. The multiprocessor system as claimed in claim 9 wherein said input ports of said plurality of circuits have input buffers thereon and said output ports have output drivers thereon.

14. The multiprocessor system as claimed in claim 9 wherein said plurality of processor operate on clock cycles and wherein each of said plurality of circuits connects said signals from said plurality of input ports to said plurality of output ports in four steps.

15. The multiprocessor system as claimed in claim 14 wherein each of said steps is a clock cycle.

16. The multiprocessor system as claimed in claim 9 wherein each of said plurality of circuits is an individual integrated circuit and on a common substrate up to a predetermined number.

\* \* \* \* \*